United States Patent Office 3,522,421
Patented Aug. 4, 1970

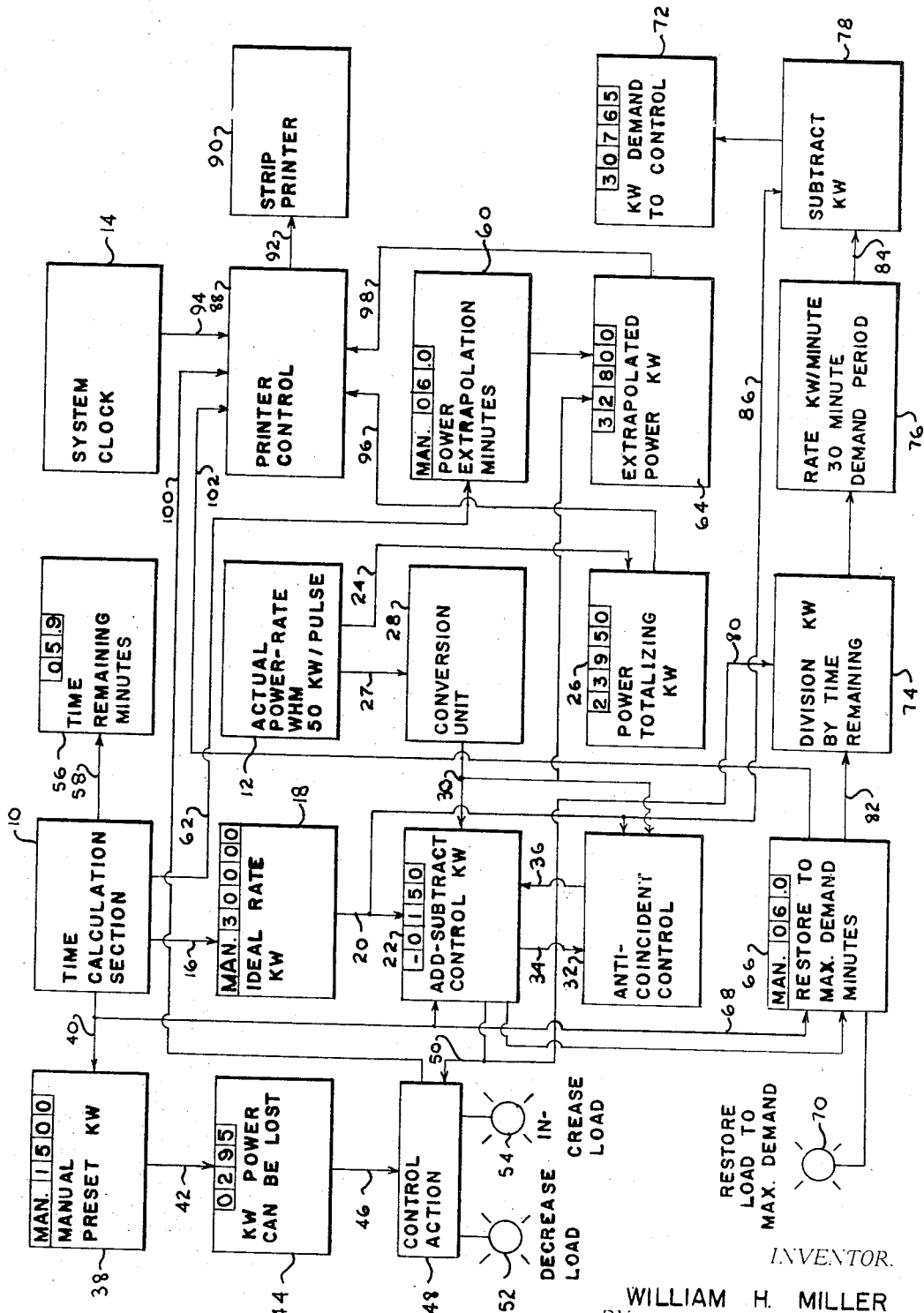

3,522,421
SYSTEM FOR MONITORING AND ADJUSTING POWER DEMAND
William H. Miller, R.F.D. 5, P.O. Box 29B, Valparaiso, Ind. 46383
Filed June 29, 1967, Ser. No. 650,078
Int. Cl. H02j 13/00
U.S. Cl. 235—151.21                    10 Claims

ABSTRACT OF THE DISCLOSURE

A system for monitoring and adjusting power demand for a preselected interval having a means for computing an ideal rate of power drain, a means for computing the actual rate of power drain, and a means for computing the difference between the actual rate of power drain and the ideal rate of power drain. A mechanism is also provided for calculating the amount of power which can be lost in the time remaining in the demand period without additional charge, and a means for comparing the amount of power which may be lost with the amount of power being gained or lost, and a means for effecting an increase or decrease in the power drain, and a means for computing the amount of power which should be drawn for the time remaining in the demand period so that the actual total power drain will equal the ideal total power drain at the end of the demand period.

---

Generally, electric power is purchased from the supplier on a demand charge of so much per kilowatt, on a half hour period of time and on a monthly basis. The billing is also figured on a kilowatt hour basis for a month. A demand charge is imposed upon the purchaser because of the rolling equipment which the supplier must have operating in order to meet any unexpected load increases. If industrial loads were constant, this demand charge could be eliminated; however, the loads encountered in industry are erratic and load changes of 15,000 kw. to 30,000 kw. almost instantly are not uncommon. The following is an example of the method by which is calculated the power charge for a plant which has a maximum demand of 30,000 kw. and in which this power is used 24 hours a day for 30 days. The demand charge is, for example, $2.50/kw. and the charge for total power consumption is $.005 kw.h.

30,000 kw. × $2.50 = $75,000
30,000 kw. × 24 hrs./day × 30 days × $.005/kw.h. = $108,000
Total charge = Demand charge plus charge for total kw.h. consumed = $183,000/month The maximum demand for the plant is set up by management at a particular number of kw. per month, with a thirty-minute period being generally used as a demand period. During each demand period, the peak power drawn may be allowed to exceed maximum demand, but the total power drawn must be kept below maximum demand. It is the duty of an operator or a computer to control this maximum demand in order that it will not be exceeded in that the demand charges imposed by the supplier makes control of the demand an economical necessity. For example, if the maximum demand is exceeded by 3,000 kw. in one-half hour period during the month, and if the cost of the electricity is figured @ $3.00/kw., the electrical cost would increase by $9,000.00, even if this same amount of power is not used again in the month. This excess charge, however, normally is avoided, by slowing down or stopping certain production units, since the cost of this power usually will not warrant the production gain by the use of the excess power.

The following will illustrate how this invention controls load using prior maximum load control means. Assume a maximum demand of 30,000 kw./half hour (30 minutes). This maximum demand figure is also the ideal rate of power usage. During each minute of the demand period, the ideal rate would be 30,000 kw. divided by 30 minutes, or 1000 kw. would be drawn per minute and after one minute of operation a total of 1000 kw. should have been consumed, and after two minutes, 2000 kw. of this total power would have been consumed, and so on until the end of the thirty minute demand period when 30,000 kw. would have been consumed. The operator compares the ideal total with the actual total after each time period in the demand period (in this case, after each minute), and if the actual total exceeds the ideal total, he determines what, if any, control actions should be taken to keep the power drawn below the maximum demand. For example, if, at the end of the first minute, 1200 kw. actual power has been drawn, and no control actions are taken, then at the end of the demand period, the actual power drawn would be 36,000 kw. or 6000 kw. above maximum demand. The operator knowing what equipment may be stopped or slowed down during any given demand period and by how much, will reduce the power drain by slowing or stopping these production units. If, by slowing down a particular unit, the total power drain is reduced by 200 kw. per minute, then the operator can correct for the power gain of 200 kw. per minute by slowing down this particular unit after half the time has elapsed, or at the end of fifteen minutes. In the foregoing system, there is a power gain every time the actual power exceeds the ideal rate, and there is a power loss when the actual power is less than the ideal rate. The quantity of power which can be lost by slowing down or stopping a production unit (called the pre-set power, or, simply, pre-set), multiplied by the amount of time remaining in the demand period is known as the amount of power which may be lost for the time remaining. A power gain of 200 kw. for fifteen minutes is a gain of 3000 kw., and a power loss of 200 kw. for fifteen minutes is a total loss of 3000 kw. Thus the aforementioned control action will cause the actual total power drain to be equal to the maximum demand at the end of the demand period, all other parameters remaining the same. A control action will result whenever the power gain becomes equal to or greater than the power which may be lost for the time remaining in the demand period.

The prior operation described below is known as extrapolation or extrapolated power. Extrapolated power, predicted power, and power anticipator have the same meaning when they apply to this type of computer power control. Extrapolated power is derived by dividing the amount of power that is being drawn by the number of time periods in a demand period, multiplying this figure by the number of time periods remaining in the demand period, and adding this to the total power consumed up to the time fo the calculation, thus giving the amount of power that would be used by the end of the demand time period, if the equipment continued drawing power at the same rate. For example, if power were being used at the rate of 1000 kw./minute for the first six minutes of the demand period, and if the computer were set up to extrapolate at this same time, then the extrapolated power would indicate 30,000 kw. The actual power used for the first six minutes would be equal to 6000 kw. and, if it is assumed that this same rate of power will be used for the remaining 24 minutes, then the power drawn during the remainder of the demand period would be equal to 24 minutes × 1000 kw./minute or 24,000 kw. Then, the 24,000 kw. plus the 6000 kw., which has already been used, would equal the extrapolated power of 30,000 kw. Whenever the extrapolated power exceeds the maximum demand by the amount of kw. in the pre-set for the time remaining, then a control action will result.

The foregoing type of control action by a computer will work satisfactorily if the electrical loads are relatively constant. However, in conditions where the load changes are not constant and where instantaneous load changes of 15,000 kw. to 30,000 kw. can occur, extrapolated power control will not function properly to control the electrical load. For example, assume that the operation is in the last minute of the demand period (29th minute) and the plant load is running on the ideal rate of 29,000 kw. at this particular time (maximum demand 30,000 kw. or 1000 kw./minute). The extrapolated power would indicate 30,000 kw. for the 30th minute. Also, at the start of the 29th minute, if the plant load should jump to 36,000 kw., this would result in the use of 6000 kw. above the maximum demand (36,000 kw. minus 30,000 kw.), or there would be a power gain of +200 kw./ minute at the end of the demand period (6000 kw. divided by 30 minutes gives the power gain per minute). Since this is the last minute of the demand period, the computer can take no more control action because the end of the demand period will be the start of a new demand period at which time the computer must be re-set to zero for the next period. Another problem of control will arise whenever the pre-set is too close to the maximum demand. For example, if the extrapolated power pre-set is 1000 kw. below the maximum demand, then abrupt increased load changes, which are greater than this pre-set, can destroy this figure and erroneous control signals will result.

From the foregoing, it is clear that a system based upon extrapolation, at a time when it is providing indication that the total power drawn during a demand period is equal to or less than the maximum demand, may be in error, causing errors which could be costly to the manufacturer. In addition, such a system will indicate to the operator that he should decrease a load when it is undesirable to do so, such as when a piece of machinery is in the middle of its operation. For example, if, at the beginning of a demand period, a piece of machinery is being used which draws 36,000 kw., and the maximum demand is 30,000 kw., the computer will extrapolate and give a reading of 36,000 kw., which exceeds the maximum demand. At the end of the first minute, assuming a pre-set of less than 6000 kw., the computer will give an indication to the operator to reduce the load. If the machine has not yet completed its operation, it could be wasteful and costly to stop or slow down the machine. Every time the machine would come on, the computer would indicate that the operator should cease operation of the machine, thus creating erroneous and possibly costly control. The present invention, while still providing extrapolation indication, does not derive its control signals from extrapolation, and is therefore not subject to the aforementioned faults of an extrapolator computer.

It is therefore an object of the present invention to provide an indication when to increase or decrease the power drawn by the industrial equipment, while allowing a controllable deviation from the ideal rate of power usage in order to limit shut-downs at undesirable times.

Another object of this invention is to provide a means for indicating the power which should be used for the remainder of the demand period in order for the total power drawn to be equal to the maximum demand.

Further objects and advantages will become apparent from the following description and accompanying diagram wherein the single figure shows a block diagram of the present system for monitoring and adjusting power demand. The numerical values shown in the individual blocks in the diagram are for illustration only, and should not be considered as limiting the scope of the invention.

Referring to the diagram, the three basic signal sources for the circuitry are the time calculation section 10, input actual rate Watt Hour Meter (abbreviated WHM) 12, and the system clock 14. Time calculation section 10, receives a pulse from the input WHM 12 at the beginning of each demand period, which signifies the beginning of the demand period, and sets the function blocks of the present computer in the initial state necessary for beginning operation in the new demand period. Time calculation section 10, provides all the timing pulses to the control circuitry by producing pulses at a definite interval, such as, for example, every six seconds (every one-tenth minute). These timing pulses leave block 10 and travel through line 16 to the ideal rate block 18, where they are utilized to incrementally advance the ideal rate signal output in accordance with the time elapsed in the demand period. At the beginning of the demand period, the output of the ideal rate block 18, will be zero, which corresponds with a total ideal power consumed at that time of zero kw. If, as shown in the drawing, the maximum demand is set at 30,000 kw., then for one timing pulse per six seconds (300 per half hour), each pulse received from the time calculation section 10 is interpreted by the ideal rate block 18 as 30,000 divided by 300, or 100 kw. per pulse. Thus, with each consecutive pulse, the ideal rate block 18 gives an output indicating the power that should have been consumed up to that time, if the system were operating at maximum demand. For example, at the end of the first six seconds, block 18 indicates that ideally 100 kw. should have been drawn at the end of the first twelve seconds, 200 kw., and so forth. The output of ideal rate block 18 is sent through line 20 to add-subtract control block 22, where the ideal rate is compared with the actual rate.

The input actual power rate WHM block 12 sends out pulses, each pulse corresponding to 50 kw. actual power drawn. The pulses leave 12, travel through line 24 and arrive at power totalizing block 26, where the pulses are registered and totaled, giving the total power used up to that time in the demand period. Pulses from the input actual power rate WHM block 12 also travel through line 27 to conversion unit 28, which provides a 5 to 1 conversion of the pulses from block 24. This provides 10 kw./ pulse, which produces in the computer a substantially shorter reaction time to power changes. For example, if the industrial equipment is drawing 31,500 kw., then the power gain is 31,500 minus 30,000 or 1500 kw. Using 50 kw. as one pulse, then a 1500 kw. power gain is equal to 30 pulses/half hour or a 1 pulse gain for every minute above the ideal rate of 20 pulses/minute. By using the 50 kw. pulse as a basis for computer calculations, the difference between actual and ideal rates would only show up after a minute of operation. If the power gain occurred in the last minute of the demand period, no correction could be made; however, using a 10 kw. pulse for the calculations, a 1500 kw. power gain is equal to 150 pulses/half hour or 5 pulses/minute or one pulse gain every twelve seconds, thus permitting correction after only 12 seconds.

The signal from block 28 goes through line 30 to add-subtract block 22, which gives a plus or minus indication of the difference between the actual total and the ideal total power drawn. If the actual total power drawn for the demand period at the time of comparison is greater than the ideal total at that time, the add-subtract control will indicate a positive difference, and if the actual total is less than the ideal total, the difference will be indicated as negative. A positive difference is known as a power gain and a negative difference is known as a power loss.

Anti-coincident control block, 32, provides assurance against losing some of the input pulses. This block receives the same pulses from the ideal rate block 18 and from conversion unit 30 that the add-subtract control block 22 receives. Anti-coincident control block 32 also receives, through line 34, a composite of the pulses as seen by the add-subtract block 22, which it compares with the pulses it receives from ideal rate block 18 and conversion unit 28. If there is a discrepancy between the number of pulses received from blocks 18 and 28 and the signals received from block 22, it sends corrective pulses through line 36 to add-subtract control 22. This is necessary because if two pulses are received by add-subtract block 22 simultaneously, block 22 may only register the occurrence of one of these pulses.

The manual pre-set block 38, is set by the operator of the computer to the quantity of power that he decides can be lost during the demand period. This quantity is determined by selecting one or more pieces of machinery which may be slowed down during their operation and totaling the amount of power that would be lost by slowing these production units down. For example, it may be decided that it is permissible to slow down a particular unit at any time during the demand period, and that by doing so, 50 kw. can be lost for every minute of the slowed operation. Then for the thirty minute demand period, a total of 1500 kw. can be lost. This value is manually pre-set into manual pre-set block 38. Block 38 receives timing pulses from time calculation section 10, which it utilizes in calculating the amount of power which may be lost during the time remaining in the demand period, said amount being passed on through line 42 to the "power can be lost" block, 44, where this amount is displayed. At the beginning of the demand period, block 44 will indicate 1500 kw. and after each six-second timing pulse, this figure will be reduced by an appropriate amount, such that at the end of the timing period, the total power than that can be lost will be indicated as zero. This means that at each six-second pulse, the amount shown in block 44 will be reduced by 1500 divided by 300 (the number of timing pulses per half hour), or 5 kw. per pulse. That is, at the end of six seconds, block 44 will indicate 1495 kw., at the end of twelve seconds, it will indicate 1490 kw., and so on. A signal representing the amount displayed by block 44 travels through line 46 to control action block 48, where it is compared with the power gain or loss signals being sent through line 50 from add-subtract control block 22. Whenever the power gain is equal to or greater than the power which can be lost for the time remaining, or whenever the power loss is equal to or greater than the power which can be gained for the time remaining, a control action will result, informing the operator that he should increase or decrease the load. This is in contrast to an extrapolator control system, which will produce a control action whenever the extrapolated power exceeds the maximum demand by the amount of kw. in the pre-set for the time remaining in the demand period. In the present example, with 5.9 minutes remaining in the demand period, a total of 295 kw. may be lost for the remainder of the demand period. If, at this time, the add-subtract control block 22 indicated more than 295 kw. difference between the actual and the ideal power being drawn, a control action would result. If the add-subtract control 22 indicated a positive difference (a power gain), a signal telling the operator to decrease the load would result, and if the number indicated by the add-subtract control were negative (indicating a power loss), the operator would be informed to increase the load. These signals usually are in the form of visible and audible indications such as lights or buzzers. In this diagram, the signaling devices have been illustrated as decrease-load and increase-load lights, 52 and 54, respectively, although other signaling means may be used if desirable. Time remaining block 56 receives timing pulses from time calculation section 10 and gives a visual indication in tenths of minutes of the time remaining in the demand period.

Power extrapolation "min." block 60 receives timing pulses from time calculation section 10 through line 62, and when the manually set time on the power extrapolation block 60 is equal to the time shown on time remaining block 56, it allows the extrapolated power block 64 to function. Extrapolated power block 64 makes a prediction of the total amount of power that would be used at the end of the demand period if power were to continue to be drawn at the present rate. This block receives pulses from the conversion unit 28, divides the amount of power being drawn (as indicated by said pulses) by the number of time periods in the demand period (300 in this example) and multiplies this result by the number of time periods remaining in the demand period. This result gives the amount of power which would be drawn for the remainder of the demand period if power continued to be drawn at the same rate. Adding this figure to the total power already drawn in the demand period gives the total amount of power (extrapolated power) which would be consumed by the end of the demand period if power consumption remained constant until the end of the demand period. If extrapolated power were used for control, a control action would have resulted much earlier than with the present system, since the difference between the extrapolated power of 32,800 kw. exceeds the maximum demand of 30,000 kw. by far more than the quantity of power which may be lost for the time remaining of 295 kw., even though it is still easy for control action to be taken which will keep the actual power drawn below maximum demand.

Restore to maximum demand block 66 receives timing pulses from the time calculation section, 10, through line 68, and turns on indicator light 70 if the number appearing in add-subtract control block is zero or negative to inform the operator to increase the power being drawn to the rate shown by "kw." demand to control block 72 in order to operate at as close to maximum demand as possible. Block 66 also functions to activate "division kw. by time remaining" block 74, rate kw./minute block 76, subtract block 78, and "kw." demand to control block 72 when the manually set time on block 66 is greater than the time remaining in the demand period. Assuming that blocks 72, 74, 76, and 78 have been activated, division block 74 receives the power differential between the actual and ideal rate of power being drawn at that time from add-subtract control block 22 through line 80, and divides this differential by the time remaining in the demand period. Division block 74 receives its timing signal from restore to maximum demand block 66 through line 82. The output of division block 74 tells how much power is being gained or lost per time period (per six seconds in the present example). Multiplying the gain or loss per time period by the number of time periods in a demand period gives the total difference between the actual rate and the ideal rate for the entire demand period at the present rate of power being drawn. This multiplication operation is performed by rate kw./min. block 76. A minus sign appearing in add-subtract control block 22 would indicate that the load is under the ideal rate, and the load should be increased by the amount determined by block 76. If the add-subtract block 22 indicates a positive sign, then the load is over the ideal rate, and the load should be reduced by the amount determined by block 76. The output of block 76 goes through 84 to block 78, where the power determined by block 76 is subtracted from the ideal rate received from ideal rate block 18 through line 86. If the output of block 76 is negative then subtraction of the negative number in block 78 causes a number larger than the ideal rate to appear in "kw." demand to control block 72, which is the indicator for the output of block 78. The figure appearing in block 72, in this example 30,765, is the rate of power which should be drawn for the remainder of the demand period in order for the total power drawn in the demand period to equal the maximum demand. This figure is greater than the ideal rate because, as the negative sign in block 22 indicates, the load being drawn is less than the ideal load, and the load should therefore be increased. A positive sign appearing in block 22 would cause the power indicated in block 72 to be less than the ideal rate.

Printer control block 88 receives signals representing information which are desirable to be recorded for future reference and converts these signals into the form required by stip printer block 90. Strip printer block 90 records the time of the start and end of each demand period, power drawn during the demand period, extrapolated power, and control actions taken by the present computer. Strip printer block 90 receives the information it records from printer control 88 through line 92. Printer control block 88, in turn, receives timing signals signifying the beginning and end of each demand period from system clock 14 through line 94. System clock 14 is synchronized both with time calculation section 10 and with the power demand meters used by the power supplier, assuring that the same period of time is used for the demand period by both the supplier and the consumer of the power printer. Printer control 88 also receives a signal representing the total power consumed at all times during the demand period through line 96 from power totalizing block 26. Signals representing the extrapolated power travel to printer control block 88 from extrapolated power block 64 through line 98. Control actions taken by the present computer are received by the printer control from control action block 48 and from restore to maximum demand block 66 through lines 100 and 102, respectively.

While the foregoing has described the operation of the computer with specific reference to industrial control of power demand, it is apparent that the invention is applicable in fields other than those described.

I claim:

1. A system for monitoring and adjusting power demand for a preselected demand interval, comprising a means for producing primary pulses at a frequency proportional to the actual rate of electrical power being consumed, a divider means for producing secondary pulses in synchronization with said primary pulses and at a frequency which is an integral multiple of the frequency of said primary pulses, a means for producing a signal representing the actual power consumption for the time elapsed in said demand period, a means for producing a signal representing a predetermined ideal rate of power consumption, a difference-calculating means for calculating the difference between said predetermined ideal rate and said actual rate, lines connecting said difference-calculating means with said divider means and with said ideal rate means, a power-loss calculating means for calculating the quantity of power which may be lost for the time remaining in said demand interval, a control means for determining the deviation of said power which may be lost for said time remaining in said demand interval, from said difference between said predetermined ideal rate of power consumption and said actual rate of power consumption, said control means having a means for effecting an increase or a decrease in power consumption in accordance with said deviation, and an optimizing means for indicating the amount of power which should be drawn for the remainder of said predetermined demand interval in order for the total actual power drawn to be equal to the total ideal power drawn.

2. A system for monitoring and adjusting power demand for a preselected demand interval as defined in claim 1, containing a timing means, said timing means producing pulses at equally-spaced intervals.

3. A system for monitoring and adjusting power demand for a preselected demand interval as defined in claim 2, in which said timing means produces a signal representing an ideal total power consumption for the time remaining in said demand period, and in which said means receives for producing a signal representing a predetermined ideal rate of power consumption pulses from said timing means, said signal representing an ideal rate of power consumption which increases by a predetermined increment with each successive timing pulse.

4. A system for monitoring and adjusting power demand for a preselected demand interval as defined in claim 2, in which said power-loss calculating means receives pulses from said timing means, said power-loss calculating means producing an output signal representing said quantity of power which may be lost for said time remaining in the demand period, said signal indicating a quantity which decreases by a predetermined increment with each successive timing pulse.

5. A system for monitoring and adjusting power demand for a preselected demand interval as defined in claim 3, in which said power-loss calculating means receives pulses from said timing means, said power-loss calculating means producing an output signal representing said quantity of power which may be lost for said time remaining in the demand period, said signal indicating a quantity which decreases by a predetermined increment with each successive timing pulse.

6. A system for monitoring and adjusting power demand for a preselected demand interval as defined in claim 5, in which said optimizing means contains a dividing means for dividing said difference between said ideal rate of power consumption and said actual rate of power consumption by the time remaining in said demand period, a line connecting said dividing means with said means for calculating said difference, and a line connecting said dividing means with said timing means, a line connecting the output of said dividing means with a multiplying means for multiplying said output of said dividing means by a predetermined number representing the total amount of time in said demand interval, a line connecting the output of said multiplying means with a subtracting means for subtracting said output of said multiplying means from a preselected ideal total power consumption for the entire demand period, a line connecting the output of said subtracting means with an indicating means, said indicating means providing indication of the output of said subtracting means.

7. A system for monitoring and adjusting power demand for a preselected demand interval as defined in claim 6, containing an actuating means for energizing said optimizing means at a preselected actuating time in said demand interval, a line connecting said actuating means with said means for calculating said difference between said predetermined rate and said actual rate, and a line connecting said actuating means with a signalling means, said signalling means providing an indication after said predetermined actuating time if the actual power rate is equal to or less than the ideal power rate.

8. A system for monitoring and adjusting power demand for a preselected demand interval as defined in claim 1, containing a totalizing means for totalizing the amount of power consumed at all times during said preselected demand interval.

9. A system for monitoring and adjusting power demand for a preselected interval as defined in claim 3, containing a means for correcting for errors arising from simultaneous entries of pulses into said difference-calculating means.

10. A system for monitoring and adjusting power demand for a preselected demand interval as defined in claim 1, containing a means for indicating the time remaining in said demand interval.

References Cited

UNITED STATES PATENTS 3,233,176  2/1966  Iben _____ 324—103
3,387,121  6/1968  Maczuzak et al. ____ 235—151.21

MALCOLM A. MORRISON, Primary Examiner

E. J. WISE, Assistant Examiner

U.S. Cl. X.R.

235—150.1; 324—103